(12) United States Patent
Tait

(10) Patent No.: US 11,807,804 B2
(45) Date of Patent: Nov. 7, 2023

(54) METHOD FOR SEALING A BORE

(71) Applicant: Solutions for Millennia Pty Ltd, Spring Hill (AU)

(72) Inventor: Peter James Tait, Acacia Ridge (AU)

(73) Assignee: Solutions for Millennia Pty Ltd, Spring Hill (AU)

( * ) Notice: Subject to any disclaimer, the term of this patent is extended or adjusted under 35 U.S.C. 154(b) by 0 days.

(21) Appl. No.: 17/840,879

(22) Filed: Jun. 15, 2022

(65) Prior Publication Data
US 2022/0411688 A1 Dec. 29, 2022

(30) Foreign Application Priority Data
Jun. 23, 2021 (AU) ................................ 2021901890

(51) Int. Cl.
*E21B 33/138* (2006.01)
*C09K 8/42* (2006.01)

(52) U.S. Cl.
CPC ............ *C09K 8/426* (2013.01); *E21B 33/138* (2013.01)

(58) Field of Classification Search
None
See application file for complete search history.

(56) References Cited

U.S. PATENT DOCUMENTS

| | | | | |
|---|---|---|---|---|
| 4,267,062 | A | * | 5/1981 | Byerley .................. E21B 33/00 166/305.1 |
| 4,919,989 | A | * | 4/1990 | Colangelo ............... E21B 33/14 428/131 |
| 2009/0188718 | A1 | * | 7/2009 | Kaageson-Loe ...... E21B 21/003 175/57 |
| 2011/0203795 | A1 | * | 8/2011 | Murphy ................... C09K 8/42 166/135 |

\* cited by examiner

*Primary Examiner* — Andrew Sue-Ako
(74) *Attorney, Agent, or Firm* — Dority & Manning, PA

(57) ABSTRACT

In one aspect, a method for plugging a bore includes pumping a slurry composition comprising a swellable phyllosilicate clay in an amount of 70 wt % or less into the bore, and permitting compaction of the phyllosilicate clay in the slurry to plug the bore.

12 Claims, 1 Drawing Sheet

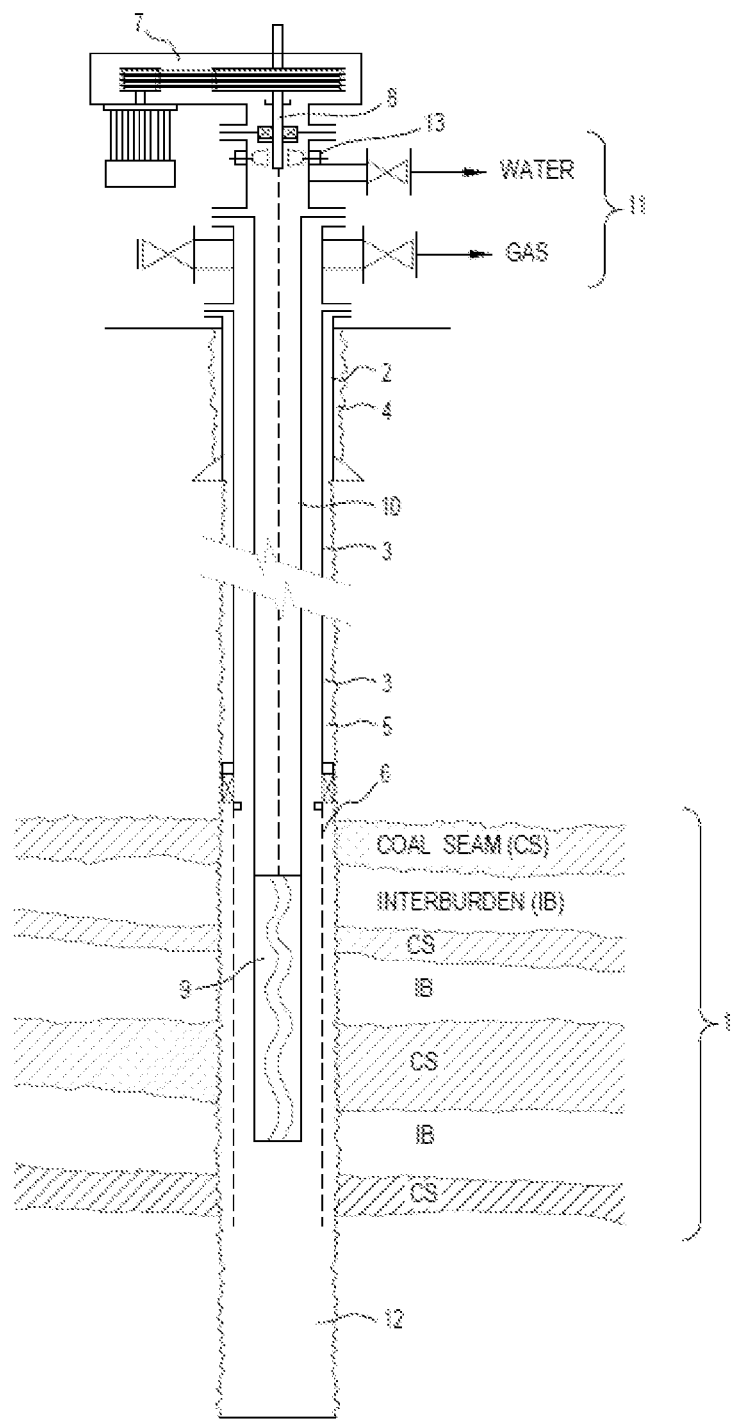

METHOD FOR SEALING A BORE

CROSS-REFERENCE TO RELATED APPLICATIONS

This application is based upon and claims the right of priority to Australian Patent Application No. 2021901890, filed Jun. 23, 2021, the disclosure of which is hereby incorporated herein by reference in its entirety for all purposes.

FIELD

The invention relates to methods for plugging a bore, such as a coal seam gas well.

BACKGROUND

Commonly, oil, gas and water wells are abandoned by sealing them with cement. Portland cement and water are mixed into a slurry, pumped down the well and spotted at specific locations and allowed to set to create a seal. Regulatory requirements vary from one region to another, but usually there is a requirement to conduct testing to confirm the lower cement plugs have set and are secure prior to placing cement plugs higher in the well. In Queensland for Coal Seam Gas wells, it is a requirement that the bottom cement plug is allowed to set and then is subjected to a known down-load to confirm its mechanical integrity prior to placing cement plugs at higher elevations.

This cementing operation requires a workover rig and cement equipment to get the cement to the right location. In a conventional plugging operation, cement mixed with water is pumped into the well and spotted over specific locations to locally plug the well. The specific requirements vary from one locality to another, but for a coal seam gas well, generally the entire region of the coal seam is covered by cement slurry, though there may be intervening sections filled with corrosion inhibited water with plugs holding additional cement plugs higher up the well.

Although sealing wells with cement is a common process, this process has a number of significant shortcomings.

Due to potential shrinkage of the cement upon setting, it is usual for the height of any individual placement of cement to be limited to avoid leakage problems. That is, there is a limitation as to the depth of cement that can be placed at one time. That is, cement is placed to a certain depth, and then allowed to set. Once the mechanical integrity is verified, a subsequent amount of cement is placed, and the process is repeated until the cementing operation is complete. Given this, the process is conducted in a stepwise manner up the well in compliance with local regulations. Due to the time in waiting for cement to set, well abandonment tends to be a time consuming and expensive operation.

There are also time delays (and labour/equipment costs) associated with putting tubing into the hole to apply download upon the cement plug, testing it, and then recovering that tubing. It is also a significant disadvantage that whilst the cement plug may have been subjected to a form of mechanical integrity test, there is no guarantee the cement has adequately flowed out through the restrictions that might exist (e.g. in this example through the holes in the pre-perforated section of a well casing) to fully access the formation and effectively seal it from fluid flow.

In addition to the above, there are issues of sealing the gaps in cement that are behind casing or forcing the cement through slotted liners in order to seal the open zones behind the slotted liners or casing perforations.

Still further, a significant challenge exists where the well bore shape is complex and difficult to access. Examples of this include where slotted liner is used potentially with multiple cave-in events behind the casing leading to complex geometries to be abandoned, irregular coal exploration boreholes potentially also with localised cave-ins, complex well completions with perforations and fracking, wells into underground coal gasification voids of complex and ill-defined shape and extent, and wells into coal mining goafs for goaf gas extraction.

Other processes for plugging wells include the use of bentonite compacts which are poured into the well, these then swell in situ to plug the well. An example includes the commercial product Zonite™ by Benterra Corporation. The Zonite™ compacts are normally produced using a roller briquetting press and are poured into the well.

One advantage of bentonite compacts over cement is that they are relatively fast to deploy and given their moderate cost, it can be commercially practical to entirely fill a well rather than spot bentonite over specific zones. However, the use of bentonite compacts also has a number of drawbacks.

The compacts are relatively small pillow-shaped objects that have a long dimension (nominally 30 mm). This small size and structure means that they have relatively fast hydration kinetics and can be prone to bridging within the casing on their descent and block at an elevation leaving only fluid below them. Their shape also means that there is a lot of interparticle voidage and so the bentonite must swell significantly to completely fill the well cross section. This significant swelling tends to weaken the plug.

Further, the compacts have essentially no ability to flow out through restrictions like through the pre-perforated holes to fully access the irregular gap between the outside of the casing and the drill hole. For this reason, bentonite compacts do not represent an adequate solution.

It is also known to form bentonite into compacted cylinders which can advantageously be formed with a bevelled nose and may optionally incorporate a central hole. These features ensure rapid descent into the well, a lower probability of hang-up, and result in excellent sealing pressures with a lower voidage inherent with a cylindrical shape as compared with briquetted compacts. A significant potential to further expand is retained by the expanded bentonite plugs and they have been shown to be capable of re-healing after damage and again become impermeable after having been fractured. This is because their swollen size within the casing is designed such that the bentonite cylinders still have additional swelling capability because they are constrained by the dimensions of the casing internal diameter.

Despite the advantages of bentonite cylinders over bentonite compacts, these cylinders suffer from the same drawback as bentonite compacts in that they cannot access the irregular voids in the region of the production area. Further, these cylinders are expensive to produce and makes abandoning a well of similar cost to using cement if the entire well is to be filled with bentonite cylinders.

A significant technical barrier exists in that the use of bentonite cylinders and bentonite compacts cannot be used to plug wells that incorporate perforated liners where it is essential to provide a mechanism for bentonite to fill the irregular voids outside the confines of the casing. Cylinders can be used for fully cased and perforated wells, but in the specific case of Queensland (Australia) Coal Seam Gas wells, this represents only some 50% of Coal Seam Gas wells. This limitation equally applies to use of bentonite compacts described above. Similar issues apply to Coal Seam Gas wells throughout the world.

It is an object of the invention to address at least one shortcoming of the prior art and/or provide a useful alternative.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF INVENTION

In a first aspect of the invention there is provided a method for plugging a bore comprising:

pumping a slurry composition comprising a swellable phyllosilicate clay in an amount of 70 wt % or less into a bore, and permitting compaction of the phyllosilicate clay in the slurry to plug the bore.

In an embodiment, the slurry composition is a pumpable slurry composition.

In an embodiment, the step of permitting compaction of the phyllosilicate clay further comprises forming a phyllosilicate clay cake, the phyllosilicate clay cake comprising at least the phyllosilicate clay in a weight fraction greater than the amount of phyllosilicate clay in the slurry, and water.

In an embodiment, the slurry is formed swellable phyllosilicate clay having a dry particle size that is 10 mm or less in size.

In an embodiment, prior to the pumping step, the method comprises preparing the slurry from swellable phyllosilicate clay having a dry particle size that is 10 mm or less in size.

In one form of the above embodiment, the method further comprises a grit removal step.

In an embodiment, the slurry composition comprises the swellable phyllosilicate clay in an amount of 60 wt % or less. Preferably, in an amount of 50 wt % or less. More preferably, in an amount of 40 wt % or less. Most preferably, in an amount of 30 wt % or less. The skilled person will appreciate that the weight fraction of the swellable phyllosilicate clay is dependent on the intended application, nature of the bore, particular type of swellable phyllosilicate clay, and whether the slurry composition comprises additives such as surface active agents.

In an embodiment, the slurry composition comprises the swellable phyllosilicate clay in an amount of 5 wt % or greater.

In an embodiment, the slurry composition is an aqueous slurry composition.

In an embodiment, the bore is selected from the group consisting of a well, a drill hole e.g. an exploration hole, underground mine cavities, underground voids, or underground coal gasification chambers.

In an embodiment, the swellable phyllosilicate clay is a 2:1 phyllosilicate clay.

In an embodiment, the swellable phyllosilicate clay is selected from the group consisting of: bentonite, illite, sepiolite, kaolinite, montmorillonite, and/or combinations thereof.

In one form of the above embodiment, the swellable phyllosilicate clay comprises, consists essentially of, or consists of a 2:1 phyllosilicate clay (which is preferably bentonite) in an amount of 30 wt % or less. Preferably 25 wt % or less. Bentonite is a particularly preferred phyllosilicate clay since it exhibits a high degree of swellability.

In one form of the above embodiment, the swellable phyllosilicate clay comprises, consists essentially of, or consists of kaolinite in an amount of 70 wt % or less. Whilst kaolinite can be used, it has limited swellability (typically around 2%). As such, it is preferred to use kaolinite in combination with one or more other swellable phyllosilicate clays, and preferably bentonite. The composition of the slurry and the selection of the swellable phyllosilicate clay will depend on the bore conditions.

In an embodiment, the step of introducing the slurry composition comprises introducing sufficient slurry composition to infiltrate into a production formation adjacent the bore to seal the production formation from the bore.

In an embodiment, the bore is a well, the well comprises a well casing, and the step of introducing the slurry composition into the well comprises introducing the slurry composition into the well internally through the well casing.

In one form of the above embodiment, the well casing comprises perforations, and the step of introducing the slurry composition comprises introducing sufficient slurry composition to infiltrate into a production formation adjacent the well through the perforations to seal the production formation from the well.

In an embodiment, the method further comprises maintaining a target slurry level of the slurry composition within the bore.

In one form of the above embodiment, the step of maintaining the slurry level comprises monitoring a slurry level within the bore and, if the slurry level decreases below the target slurry level, introducing additional slurry composition into the bore to raise the slurry level to at least the target slurry level.

In an embodiment, after the step of introducing the slurry composition into the bore, the method further comprises topping up the bore with a liquid to a target liquid level.

In one form of the above embodiment, the method further comprises monitoring a liquid level of the liquid in the bore, and if the liquid level decreases below the target liquid level, introducing additional liquid and/or slurry composition into the bore to raise the liquid level to at least the target liquid level. Preferably, the liquid is water. More preferably, the liquid is process water produced or obtained from the bore such as displaced from the bore during the step of introducing the slurry composition into the bore. Monitoring the slurry level and/or liquid level in the bore may be automated, manual, and carried out continuously or periodically.

In an embodiment, the method further comprises assessing the bore to determine that the phyllosilicate clay has compacted to plug the bore.

In one form of the above embodiment, subsequent to determining that the swellable phyllosilicate clay has compacted to plug the bore, the method further comprises subjecting the bore to a secondary plugging process, the secondary plugging process comprising introducing a second plugging composition into the bore to form a second plug.

It is preferred that the second plugging composition is selected from the group consisting of: compacted phyllosilicate clay, a slurry composition comprising swellable phyllosilicate clay, and/or a cement composition.

In embodiments in which the bore is a well and the well comprises a well casing, it is preferred that the second plugging composition is provided internally within the well casing to plug the well within the well casing in a perforated or a non-perforated section of the well casing. The skilled person will appreciate that the method may comprise intervening plugging steps and/or additional subsequent plugging steps.

In an embodiment, the slurry composition has a yield stress at a shear rate of 1.0 s$^{-1}$ of less than 500 Pa. Preferably, the yield stress is less than 375 Pa. More preferably, the yield stress is less than 250 Pa. Even more preferably, the yield stress is less than 125 Pa. Most preferably, the yield stress is less than 50 Pa.

In an embodiment, the slurry composition has a density that is greater than a density of formation liquids in the bore. Preferably the density is greater than 1010 kg/m$^3$. More preferably, the density is greater than 1020 kg/m$^3$ Alternatively, or additionally, the density is less than 1800 kg/m$^3$. Preferably, the density is less than 1600 kg/m$^3$. More preferably, the density is less than 1400 kg/m$^3$. Most preferably, the density is less than 1250 kg/m$^3$. The density will depend on the type or combination of phyllosilicate clay that is selected, nature of any additives, and the intended application. For example, a 30 wt % bentonite slurry will typically have a density of around 1232 kg/m$^3$ whereas a 70 wt % kaolinite slurry will typically have a density of around 1770 kg/m$^3$.

In an embodiment, the slurry further comprises a surface active agent. Preferably, the surface active agent suppresses flocculation. Examples of suitable surface active agents include polyacrylates, silicates and urea. Typically, the slurry comprises the surface active agent in an amount of from about 0.1 wt % on dry solids basis to about 10 wt % on dry solids basis.

In an embodiment, the slurry composition further comprises a corrosion inhibitor. Preferably the corrosion inhibitor is a caustic corrosion inhibitor and has a pH of greater than 7. More preferably, the pH is 8 or greater.

In a second aspect of the invention there is provided a composition for plugging a bore or when used to plug a bore, the composition comprising a slurry of swellable phyllosilicate clay in an amount of 70 wt % or less.

In a third aspect of the invention there is provided a use of a slurry composition comprising a slurry of swellable phyllosilicate clay in an amount of 70 wt % or less in a bore plugging operation.

A fourth aspect of the invention relates to preparing a slurry composition and/or providing a slurry composition to be used, or when used, in a bore plugging operation, the slurry composition comprising a swellable phyllosilicate clay in an amount of 70 wt % or less.

In an embodiment of the second, third, or fourth aspects, the slurry composition is a pumpable slurry composition.

In an embodiment of the second, third, or fourth aspects, the slurry is formed swellable phyllosilicate clay having a dry particle size that is 10 mm or less in size.

In an embodiment of the second, third, or fourth aspects, the slurry composition comprises the swellable phyllosilicate clay in an amount of 60 wt % or less. Preferably, in an amount of 50 wt % or less. More preferably, in an amount of 40 wt % or less. Most preferably, in an amount of 30 wt % or less.

In an embodiment of the second, third, or fourth aspects, the slurry composition comprises the phyllosilicate clay in an amount of 5 wt % or greater.

In an embodiment of the second, third, or fourth aspects, the slurry composition is an aqueous slurry composition.

In an embodiment of the second, third, or fourth aspects, the slurry composition further comprises a surface active agent and/or a corrosion inhibitor. Preferably, surface active agent suppresses flocculation. More preferably, the slurry comprises the surface active agent in an amount of from about 0.1 wt % on dry solids basis to about 10 wt % on dry solids basis. Preferably, the corrosion inhibitor is a caustic corrosion inhibitor and has a pH of greater than 7. More preferably, the pH of 8 or greater.

In an embodiment of the second, third, or fourth aspects, the slurry composition has a yield stress at a shear rate 1.0 s$^{-1}$ of less than 500 Pa. Preferably, the yield stress is less than 375 Pa. More preferably, the yield stress is less than 250 Pa. Even more preferably, the yield stress is less than 125 Pa. Most preferably, the yield stress is less than 50 Pa.

In an embodiment of the second, third, or fourth aspects, the slurry composition has a density that is greater than 1010 kg/m$^3$. More preferably, the density is greater than 1020 kg/m$^3$. Most preferably, the density is 1028 kg/m$^3$ or greater. Alternatively, or additionally, the density is less than 1800 kg/m$^3$. Preferably, the density is less than 1600 kg/m$^3$. More preferably, the density is less than 1400 kg/m$^3$. Most preferably, the density is less than 1250 kg/m$^3$.

In an embodiment of the second, third, or fourth aspects of the invention, the swellable phyllosilicate clay is a 2:1 phyllosilicate clay.

In an embodiment of the second, third, or fourth aspects, the swellable phyllosilicate clay is selected from the group consisting of; bentonite, illite, sepiolite, kaolinite, montmorillonite, and/or combinations thereof.

In one form of the above embodiment, the swellable phyllosilicate clay comprises, consists essentially of, or consists of a 2:1 phyllosilicate clay (which is preferably bentonite) in an amount of 30 wt % or less. Preferably 25 wt % or less. In another form of this embodiment, the swellable phyllosilicate clay comprises, consists essentially of, or consists of kaolinite in an amount of 70 wt % or less.

In an embodiment of the first, second, third, or fourth aspects, the slurry composition comprises at least two swellable phyllosilicate clays in a total amount of 70 wt % or less. It is preferred that a first swellable phyllosilicate clay is bentonite, and that the bentonite is present in an amount of X wt %, where X wt % is 30 wt % or less, and wherein a second phyllosilicate clay is present in an amount of Y wt %, wherein Y≤70−X.

In an embodiment of the second, third, or fourth aspects, the bore is selected from the group consisting of a well, a drill hole e.g. an exploration hole, underground mine cavities, underground voids, or underground coal gasification chambers.

In an embodiment of the first, second, third, or fourth aspects, the slurry composition does not comprise a binder, such as cement.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF DRAWINGS

FIG. 1 is an illustration of a simple coal seam gas well capable of being plugged according to embodiments of the present invention.

DESCRIPTION OF EMBODIMENTS

The present invention broadly relates to the use of a slurry composition comprising a slurry of swellable phyllosilicate clay in an amount of 70 wt % or less in a well plugging operation. The invention also relates to a slurry composition per se, and methods of plugging a well with the slurry composition.

The invention can be applied to uncased or partly cased conventional oil and gas wells, water wells, hydrocarbon exploration holes, mineral exploration holes, mine cavities, underground voids and underground coal gasification chambers.

The inventor has found the slurry composition provides a highly effective and cost-effective means of plugging wells as part of the plugging and abandonment process.

In certain embodiments described herein the overall plugging process may take longer than a cement-based plugging operation. However, because expensive equipment such as a workover rig and workover crew are mobilised, conduct their work, and are demobilised prior to a second stage of the plugging operation, the actual overall cost is substantially lower. It is a significant advantage that the plugging operations according to the invention can be conducted in a manner that verifies the effectiveness of plugging prior to completion of the operations.

The invention will now be described below in accordance with one embodiment thereof in relation to a coal seam gas well.

FIG. 1 is an illustration of a simple coal seam gas well capable of being plugged according to embodiments of the present invention. The well is drilled into a series of coal seams (1) including sections of interburden between seams. Conductor casing (2) and surface casing (3) are cemented to their respective drill holes (4) and (5). Surface casing (3) includes a section that was pre-perforated prior to installation (6) typically by drilling holes through the casing for the region(s) of the coal seams (1) to be accessed.

The well is fitted with a drive arrangement used to rotate a drive shaft (8) commonly referred to as a "sucker rod" that is connected at its base to the rotor of a progressing cavity pump (9). The stator of progressing cavity pump (9) is connected to production tubing (10) that connects to the surface.

In operation, downhole pump (9) is operated by drive unit (7) to remove water from the well. This reduces pressure on coal seams (1) leading to desorption of adsorbed methane from coal seams (1) that flows towards the well, through the pre-perforated casing, and up the annulus between the outside of the production tubing and the inside of the surface casing. The gas flows out a gas line on the side of the simplified Christmas Tree (11). Similarly, water extracted from coal seams (1) by downhole pump (9) flows up the production tubing (10) and out a water outlet on Christmas Tree (11).

The well includes a significant depth below coal seams (1) referred to as a sump or rathole (12). Solids from the formation that may flow with the water or slump into the annulus area can settle at least in part in sump (12).

Sections of the accessed coal seams (1) can be subject to collapse of solids into the area outside the pre-perforated casing leading to localised blockage. Further, sump (12) may become so filled with such solids that the passage for fluid out the bottom of the casing and then behind it to access the formation may be blocked.

When it is deemed that the well is no longer commercially viable and is to be plugged and abandoned, this would normally start with "killing the well" meaning the well is filled with water to overcome the pressure of gas desorbing from the accessed formations so the gas flow stops. Thereafter, rod locks (13) are screwed in to clamp sucker rod (8) such that it cannot fall down the well. Then, drive head unit (7) is removed as are the sucker rods (8) with the rotor from downhole pump (9). This lifting task is normally conducted using a workover rig or a crane. The well is topped up with kill fluid (typically water) as required to keep the well in a fully killed state. Thereafter, the tubing anchor packer is unset and production tubing (10) is lifted from the well in sections and laid down to pull production tubing (10) and pump stator (9) from the well.

Production tubing (10) is inspected for suitability for use, pump (9) is removed and then production tubing (10) with sufficient replacement sections and additional length is returned to the well to conduct a "bottoms up" circulation of the well by pumping relatively clean water down production tubing (10) and flushing settled solids from the well including from sump (12) to the surface. Typically, a fluid volume of two times the volume of the well is circulated to ensure the well is largely clean of solids.

To plug the well, in this example, a bentonite slurry is prepared comprising bentonite in an amount of 30 wt % or less. In an alternative example, a kaolin slurry comprising kaolin in an amount of 70 wt % or less is used.

The skilled person will appreciate that the weight fraction of the swellable phyllosilicate clay (e.g. in this case bentonite or alternatively kaolin) is selected in part based on the nature of the well. In the case where it is expected that there will be little infiltration of the formation and the system relies upon fluid exchange from inside the casing to the irregular voids outside the casing followed by settling, a low weight fraction such as 7.5 wt % bentonite is likely to be suitable. However, where high degrees of infiltration are expected, a higher weight fraction, such as 25-30 wt % bentonite or about 70 wt % kaolin may be used. A low weight fraction (e.g. 7.5 wt % bentonite) is useful to achieve a low Yield Stress for the slurry in the specific case where infiltration is negligible and slurry must interchange with well fluids outside the confines of the casing. In the case where infiltration of formation is expected, a much higher solids content can be tolerated (e.g. 25 wt % bentonite) as well fluids outside the confines of the casing are pushed into the formation and a much greater pressure differential is available to force slurry through the holes (e.g. 8 mm diameter). The use of a high solids content slurry is advantageous as it speeds the process by reducing the volume of liquid that must infiltrate the formation before a thick cake forms and infiltration ceases. It is preferred to introduce slurries, particularly those formed from high weight fractions of phyllosilicate clay, soon after preparation such that the phyllosilicate clay is only partially hydrated (i.e. not fully hydrated).

In any event, the bentonite slurry this is transferred into the well via the production tubing with the production tubing string progressively lifted until such time as the well is essentially filled with bentonite slurry. Water displaced from the well is stored at surface. The hydrostatic head of the bentonite slurry exceeds the water hydrostatic head that was used to kill the well and so there exists a significant head of fluid trying to force liquid into the formation (bentonite slurry/water).

The well is temporarily capped with, for example, a suitable steel flange and a means of establishing liquid level within the top of the surface casing. The workover rig and crew can be released from the well site.

On a regular basis, the level of fluid within the well casing is topped up to keep it essentially full. The quantity of fluid used to top up the well is recorded as evidence of how much fluid the well is taking in. Initially, bentonite slurry will flow into the formation and crevices within the formation. Over time however, the bentonite starts to form a packed bed and subsequently only water is migrating into the formation with the extent of thick bentonite cake becoming increasingly large. Eventually, the entire void outside the casing and indeed the casing itself is full of a packed bed of compacted bentonite that has extremely low water permeability. Advantageously, this bentonite cake exhibits self-healing behavior, for example, for a cased well, if the well casing was to corrode, such a dense cake of bentonite can be expected to expand to make up for the loss of metal from the casing. This absolutely cannot happen in the case of cement as such loss of material inevitably leads to fluid migration pathways because the cement cannot deform and expand. The same advantages apply to other swellable phyllosilicate clays or mixtures of phyllosilicate clays, subject to their degree of swellability.

Whilst the fluid used to top up the well could be bentonite slurry, it is often more practical to top up the well with water. It is preferred to use an unmanned, automated pumping and data recording system to pump in water each day to re-establish water level in the casing. Should the well take a lot of water (indicating the water to slurry interface is a significant distance down the casing), it is possible to attend the well, install a dip tube through the top plate and use an air compressor to blow out a suitable amount of water that is then replaced with bentonite slurry. This step can be repeated as often as required.

The result of the slurry filling and fluid topping-up phase of the plugging is that the well has ceased to take in fluid and is effectively plugged where the pressure within the casing exceeds the pressure within the formation(s). Subsequently a second plugging operation at a different location within the well can be carried out. This second plugging operation can be by any previously known plugging technique or combination of techniques such as through the use of cement slurry, bentonite compacts or bentonite compacted cylinders together with any required running aids such as packers.

In the embodiment described herein, compacted bentonite cylinders are selected for the second plugging operation. To carry out the second plugging operation, at a higher elevation in the well, for example over the top 30 m of the well, compacted bentonite cylinders are lowered into the well and allowed to swell to seal off the well. The leading cylinders can be pushed through slurry to a particular depth, suspended by suitable means at a particular depth or allowed to descend very slowly through the slurry until their natural swelling behaviour causes them to stop descending and continue to swell and plug the upper portion of the well. Usually this second plugging operation is conducted within a section of casing that is not perforated to avoid the challenges that exist at the location of the formation.

The compacted bentonite cylinders swell to plug the well casing and provide an extremely strong barrier capable of resisting fluid trying to migrate up the casing towards the surface. By this combined means (slurry blocking of the production zones with confirmation of plugging followed by—in this example—bentonite cylinders to plug a higher elevation portion of the casing, there is provided a highly effective and durable means of well plugging with the additional benefit of self-healing capability.

It is noted that whilst this embodiment relates to a specific case of a coal seam gas well that is vertical, the skilled addressee will appreciate based on the teachings herein that the method of the invention can be applied to conventional oil and gas wells, water wells, hydrocarbon exploration holes, mineral exploration holes, mine cavities, underground voids and underground coal gasification chambers.

Further, whilst the embodiment relates to a well that is vertical, the well can be deflected, include horizontal sections or a multitude of connected boreholes.

Still further, whilst reference is made to having a cased well, the method of the invention can be applied to uncased or partly cased exploration holes. The irregular void being filled can be the result of under-reaming, natural drill hole shape, the result of multiple collapse events, the presence or not of cracks and crevices due to hydraulic fracturing or faults, the result of mining activities or underground combustion. The complications on gaining access to the voids can include due to collapse events or the installation of packing gravel and the like.

An exemplary procedure for carrying out the method according to one embodiment is outlined below. The skilled person will appreciate that certain steps outline below may be option, or specific to a particular well type, further the skilled person will appreciate that the method may include other steps.

Step 1: Mix water and bentonite and optionally including a suitable surface acting agent and/or corrosion inhibiting agent to form a slurry. In the case of bentonite, the slurry can be 1-30% solids and the surface acting agent, if used, will be at a concentration which will enhance compaction of bentonite during settling of the bentonite in the slurry, allowing free water to move up on top of the slurry. To this end, it is preferred to use a surface active agent that suppresses flocculation. Whilst reduced flocculation is normally associated with slower settling, it has been found that it can lead to more compact settled mass when compared to slurries that have been flocculated. Flocculated slurries exhibit an initial fast settling rate, but then reach a limiting solids content that is lower than in the case where the clay particles exhibit less flocculation. The concentration of bentonite used will depend on the nature of the void being plugged, the particular surface active agent in use and the characteristics of the bentonite but generally the surface-active agent will be dispersive in nature rather than flocculating.

Step 2: Introduce the slurry down hole, allowing any water or oil in the well to migrate to the surface through density difference between the slurry and free water and/or oil.

Step 3: Let the slurry stand so that bentonite in the slurry settles and concentrates down the hole and seals off the formation through infiltration, preventing any water or hydrocarbons from being produced from the geological formations and entering the well-bore and/or other formations.

Step 4: Monitor the well, wherein monitoring the well may include one or more of:
- monitoring the well to determine if fluid from the bentonite slurry infiltrates into the formation, if so, the slurry level in the casing will fall and fluid will be periodically introduced into the well from the surface;
- monitoring the slurry level in the casing or surface-mounted vessel and top this up periodically as required to maintain a fluid level acting down on the formation; and/or
- monitoring the well to determine if the well is allowing hydrocarbons to be produced to the surface, noting that this is not typically an issue with CSG wells because the formation pressures are substantially below the hydraulic gradient—and especially so for produced wells.

Step 5: Once water and/or slurry top-up at the surface is no longer required (i.e. the formation/s have ceased to take fluid), the well will be deemed to have been sealed. Optionally, an enhanced pressure test can be applied at this stage to confirm the well is fully sealed.

Step 6: Second stage plugging of the well can be carried out after the well has ceased to take fluids, in one example, bentonite cylinders are dropped into the well and allowed to hydrate, further sealing the well. As an alternative, any known plugging means such as through the use of bentonite compacts or cement can be used for this second stage plugging. The water and hydrated bentonite in the hole will seal the well through density difference. The formations down hole will have a pressure determined by the hydraulic gradient. However, once sealed with bentonite cylinders (or other known sealing technique for the top of the well), the well can withstand higher pressures than that resisted by hydrostatic head alone due to the integrity of the top plugging arrangement (be that swollen bentonite cylinders and/or compacts and/or cement).

It will be understood that whilst the description above relates primarily to bentonite, the skilled person will appreciate that other swellable phyllosilicate clays (or mixtures thereof) can be used. The slurry composition and the selection of phyllosilicate clays is dependent on the plugging operation and the nature of the well being plugged.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method for plugging a bore comprising:
pumping a slurry composition comprising a swellable phyllosilicate clay in an amount of 70 wt % or less into the bore,
permitting compaction of the phyllosilicate clay in the slurry to plug the bore
wherein the method further comprises maintaining a target slurry level of the slurry composition within the bore; and
wherein the step of maintaining the slurry level comprises monitoring a slurry level within the bore and, if the slurry level decreases below the target slurry level, introducing additional slurry composition into the bore to raise the slurry level to at least the target slurry level.

2. The method of claim 1, wherein the swellable phyllosilicate clay is selected from the group consisting of: bentonite, illite, sepiolite, kaolinite, and/or montmorillonite.

3. The method of claim 1, wherein the step of introducing the slurry composition comprises introducing sufficient slurry composition to infiltrate into a production formation adjacent the bore to seal the production formation from the bore.

4. The method of claim 1, wherein the bore is a well, and the well comprises a well casing, and the step of introducing the slurry composition into the well comprises introducing the slurry composition into the well internally through the well casing.

5. The method of claim 4, wherein the well casing comprises perforations, and the step of introducing the slurry composition comprises introducing sufficient slurry composition to infiltrate into a production formation adjacent the well through the perforations to seal the production formation from the well.

6. The method of claim 1 further comprising assessing the bore to determine that the phyllosilicate clay has compacted to plug the bore.

7. The method of claim 6, wherein subsequent to determining that the swellable phyllosilicate clay has compacted to plug the bore, the method further comprises subjecting the bore to a secondary plugging process, the secondary plugging process comprising introducing a second plugging composition into the bore to form a second plug.

8. The method of claim 7, wherein second plugging composition is selected from the group consisting of: compacted phyllosilicate clay, and/or a swellable phyllosilicate clay slurry, and/or a polymeric plug, and/or a metallic plug, and/or a cement composition.

9. The method of claim 7, wherein the bore is a well and the well comprises a well casing, and the second plugging composition is provided internally within the well casing to plug the well within the well casing in a non-perforated section of the well casing.

10. The method of claim 1, wherein the slurry composition has a yield stress at a shear rate of $1.0$ $s^{-1}$ of less than 500 Pa and/or a density that is greater than a density of formation liquids in the bore.

11. The method of claim 1, wherein the slurry further comprises a dispersive surfactant and/or a corrosion inhibitor.

12. A method for plugging a bore comprising:
pumping a slurry composition comprising a swellable phyllosilicate clay in an amount of 70 wt % or less into the bore,
permitting compaction of the phyllosilicate clay in the slurry to plug the bore;
wherein after the step of introducing the slurry composition into the bore, the method further comprises topping up the bore with a liquid to a target liquid level, the step of topping up the bore with a liquid comprising monitoring a liquid level of the liquid in the bore, and if the liquid level decreases below the target liquid level, introducing additional liquid and/or slurry composition into the bore to raise the liquid level to at least the target liquid level.

* * * * *